(12) United States Patent
Thompson et al.

(10) Patent No.: US 10,678,621 B2
(45) Date of Patent: Jun. 9, 2020

(54) SYSTEM ERROR CODES FOR EDGE ENCRYPTION

(71) Applicant: ServiceNow, Inc., Santa Clara, CA (US)

(72) Inventors: Frankie Thompson, San Diego, CA (US); Martin Wexler, San Diego, CA (US); Pierre Rohel, San Diego, CA (US); Hari Chetlur, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 121 days.

(21) Appl. No.: 15/723,774

(22) Filed: Oct. 3, 2017

(65) Prior Publication Data
US 2019/0102243 A1 Apr. 4, 2019

(51) Int. Cl.
*G06F 11/00* (2006.01)
*G06F 11/07* (2006.01)
(Continued)

(52) U.S. Cl.
CPC ...... *G06F 11/0772* (2013.01); *G06F 11/0709* (2013.01); *G06F 11/0751* (2013.01); *G06F 11/0775* (2013.01); *G06F 21/10* (2013.01); *G06F 21/6245* (2013.01); *H04L 63/0281* (2013.01); *H04L 63/0853* (2013.01); *G06F 16/951* (2019.01)

(58) Field of Classification Search
CPC ............. G06F 11/0709; G06F 11/0751; G06F 11/0772; G06F 11/0775
See application file for complete search history.

(56) References Cited

U.S. PATENT DOCUMENTS

| 6,925,586 B1 * | 8/2005 | Perrella | G06F 11/0709 714/15 |
| 7,917,814 B2 * | 3/2011 | Hu | G06F 11/0733 714/25 |

(Continued)

OTHER PUBLICATIONS

Changyu Dong, Shared and Searchable Encrypted Data for Untrusted Servers, 2008, DAS 2008, LNCS 5094, pp. 127-143 (Year: 2008).*

*Primary Examiner* — Elmira Mehrmanesh
(74) *Attorney, Agent, or Firm* — Fletcher Yoder PC

(57) ABSTRACT

Embodiments are disclosed herein that provide users of a cloud computing system with the ability to determine, display, prioritize, and/or handle error messages, e.g., using a system-wide standardized naming format. In some embodiments, the appropriate system-wide standardized error messages may be determined, even in situations where at least some of the data underlying the error is encrypted and remains unknown to the hosted cloud computing system. The system-wide standardized error messages may include, e.g., an indication of a company's name, an application name, as well as a unique error code. The standardized error message may also include information as to how the error may potentially be remediated. Using these embodiments, users may be able to more quickly understand which errors to address first and what possible solutions may be employed in order to resolve those errors—while remaining confident that any encrypted information has remained uncompromised.

17 Claims, 9 Drawing Sheets

(51) Int. Cl.
  *H04L 29/06* (2006.01)
  *G06F 21/62* (2013.01)
  *G06F 21/10* (2013.01)
  *G06F 16/951* (2019.01)

(56) References Cited

U.S. PATENT DOCUMENTS

| | | | |
|---|---|---|---|
| 8,429,421 B2* | 4/2013 | Chase | G06F 21/6227 713/189 |
| 8,473,740 B2* | 6/2013 | Vion-Dury | H04L 9/14 380/277 |
| 8,615,668 B2* | 12/2013 | Matsuda | G06F 21/6245 713/189 |
| 9,118,631 B1* | 8/2015 | Yung | H04L 9/008 |
| 9,158,648 B2* | 10/2015 | Bartlett | G06F 11/3055 |
| 9,329,984 B2* | 5/2016 | Dhangar | G06F 11/3692 |
| 9,916,465 B1* | 3/2018 | Erickson | G06F 3/0481 |
| 2007/0079117 A1* | 4/2007 | Bhogal | H04L 9/00 713/160 |
| 2011/0093720 A1* | 4/2011 | Thomas | G06F 21/602 713/189 |
| 2011/0113050 A1* | 5/2011 | Youn | G06F 21/6218 707/757 |
| 2014/0129882 A1* | 5/2014 | Harden | G06F 11/0766 714/57 |
| 2015/0186674 A1* | 7/2015 | Vyas | H04L 63/0421 726/26 |
| 2016/0041866 A1* | 2/2016 | Oleynikov | G06F 16/9535 714/15 |
| 2016/0328282 A1* | 11/2016 | Rogati | G06F 11/0772 |

\* cited by examiner

SYSTEM ERROR CODES FOR EDGE ENCRYPTION

TECHNICAL FIELD

The embodiments described herein relate generally to error code management and, more particularly, to a hosted system for presenting meaningful, standardized error codes and diagnoses, even in an environment that includes errors raised on encrypted remote servers, wherein the underlying content on the encrypted remote servers is not known to the hosted system.

BACKGROUND

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety computing functions, e.g., storing and/or processing large quantities of computing data (including encrypted data, such as sensitive, personally-identifiable customer information). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

In today's communication networks, examples of cloud computing services a user may utilize include so-called software as a service (SaaS) and platform as a service (PaaS) technologies. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts an extension of SaaS that goes beyond providing software services by offering customizability and expandability features to meet a user's needs. For example, PaaS can provide a cloud-based developmental platform for users to develop, modify, and/or customize applications and/or automating enterprise operations without maintaining network infrastructure and/or allocating computing resources normally associated with these functions.

Within the context of cloud computing solutions for enterprise applications, users may be asked to deal with ever increasing numbers of programs and applications, as well as the log files, warnings, alerts, and various error messages related to such programs and applications. Without a uniform scheme with which to classify the source, type, severity and/or corrective actions for the errors raised by the various programs and applications, users tasked with troubleshooting enterprise-level, IT, and/or other organization-related functions (e.g., incident tracking and/or help desk-related functions) may not be able to efficiently perform their job functions. As a result, it can be difficult for users of such enterprise applications to appreciate or understand the root causes and/or solutions—or even the sources—of the various error messages that are raised within an enterprise system.

Moreover, when such systems include remote client servers and proxies logging encrypted content, it is important that the enterprise system still be able to provide appropriate error messages, error tracking, and error diagnosis—even if the system is unable to decrypt the related encrypted content stored at such remote servers. Thus, system-level error message handling and remote server error management continue to be potential areas of improvement for software developers and application vendors, particularly in systems where one or more servers log encrypted content that the system is not able to decrypt. The following embodiments address improvements to the standardization and handling of enterprise-level error messages to address at least these and other issues relating to the recommendation of corrective actions and/or probable causes of errors—particularly in systems wherein encrypted content is logged—to provide an enhanced user experience.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment, a system that provides the ability to determine and/or display various enterprise-wide error codes is disclosed, which may comprise a display device, a non-transitory memory, and one or more hardware processors configured to read instructions from the non-transitory memory. The system also may, e.g., comprise one or more servers hosting an instance of one or more enterprise applications for a client entity (e.g., a customer) having remote servers, wherein at least some content on the remote servers is stored or logged in an encrypted format. When executed, the instructions can cause the one or more hardware processors to receive an indication of a first error, wherein the first error relates, at least in part, to encrypted information stored or logged at a first client instance that is remote to the system.

The system may then determine a first appropriate, standardized system error code for the first error based, at least in part, on the received indication of the first error. For example, the indication of the first error may include information obtained from one or more log files on the first client instance. Notably, the first system error code determined by the system may be configured such that it does not expose or rely on the decrypted values of any of the related encrypted information. In addition to determining the appropriate, standard system error code for the first error, in some embodiments, the system may also determine one or more diagnoses for the first system error code. These diagnoses may, e.g., include: a message with remediation guidance related to the first error; a root cause of the first error; a knowledge article related to the first error; a link to a knowledge article related to the first error; one or more symptoms of the first error; one or more effects of the first error; or one or more corrective actions related to the first error. In some embodiments, the corrective actions may also include an automated or user-selected option to have the system 'self-heal,' i.e., perform a recommended or most likely remediation action for the present error condition. The recommended or most likely remediation actions may be predetermined, or may be 'learned' over time by the system, e.g., based on the corrective actions that have most frequently led to the successful resolution of a given error condition. Finally, the system may transmit the first system error code (which does not rely upon, or reveal, any of the encrypted content from the remote server instance), as well as the one or more diagnoses, to the first client instance for display, e.g., via a visual user interface.

In some embodiments, the system may also present a visual user interface on the system's display device, e.g., in the form of a "dashboard" that is able to display one or more statistical values captured on the client instance. For example, in some embodiments, latency values related to message parsing on the first client instance (as well as any other monitored client instances) may be captured over an adjustable first period of time. The latency values may relate, e.g., to the respective average (or maximum, minimum, median, etc.) times spent at each point along the path of a message's (e.g., an error message's) journey. For example, latency times may be tracked as an error message is raised from a customer's browser, pushed through an "edge" proxy server, then processed internally by an error rules engine at the proxy so that the appropriate system error code may be determined, then sent out to a hosted instance, so that the instance may respond back (a process also referred to as the "round trip). The data may then be processed by the proxy, so that it may be returned to the browser with full round trip latency information. By reporting latencies at each of these stages, customers may more easily be able to determine where the bottlenecks in their system are, which may allow for more rapid troubleshooting of the error messages. In other embodiments, statistics related to CPU usage, memory usage, system health, synchronization, authentication, certificate usage, content checks, etc., may also be captured and reported in the visual user interface. Anomalies in any of the aforementioned statistical values may result in the creation of an appropriate system-wide error code to help in remediating the current error condition(s).

By building a standardized library of uniquely-identified, system-wide error codes for an enterprise system, the logging of errors can more quickly lead to documented root causes, manual solutions—and even potentially automated solutions. According to some embodiments, all error logging routines in the system may have access to the aforementioned error message formatting standard. In some embodiments, in addition to an identifier for the type of error itself, the error message naming format may comprise one or more recognizable prefixes that may be used to identify the company whose produce is the source of the error, and/or the specific application that raised the error (e.g., COMPANY1-APPNAME-ERROR_TYPE). In such embodiments, each application may build up its own error message knowledge base, i.e., once it has been assigned its own application-specific prefix, which will not conflict with any other applications in the system. In other embodiments, the error message naming format may be further extendible and/or customizable by particular customers, based on the needs of a given implementation.

In other embodiments, methods to perform the various system-wide error code standardization techniques summarized above are disclosed. In still other embodiments, non-transitory program storage devices are disclosed, which are readable by programmable control devices and which store instructions configured to cause one or more programmable control devices to perform the various system-wide error code standardization techniques summarized above.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

Figure 1:
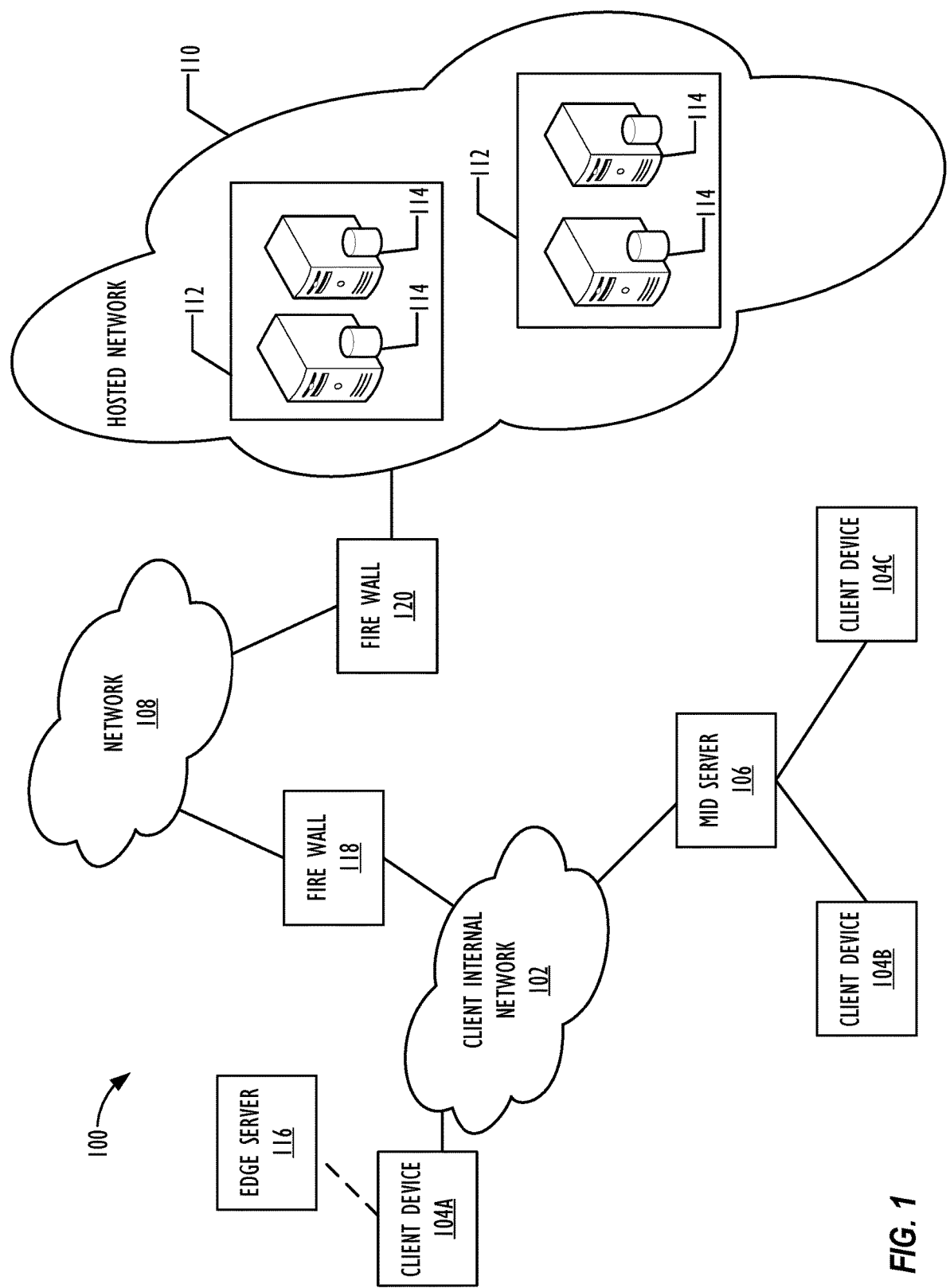
FIG. 1 is a block diagram of an embodiment of a cloud computing system where embodiments of the present disclosure may operate.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity, unless explicitly so defined, but, rather, are intended to include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

As used herein, the term "computing system" refers to a single electronic computing device that includes, but is not limited to a single computer, virtual machine, virtual container, host, server, laptop, and/or mobile device, or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

Various embodiments are disclosed herein that provide users of a cloud computing system with the ability to determine, display, prioritize, and/or handle error messages, e.g., using a system-wide standardized naming format. In some embodiments, the appropriate system-wide standardized error messages may be determined, even in situations where at least some of the data underlying the error is encrypted and remains unknown to the hosted cloud computing system. The system-wide standardized error messages may include, e.g., an indication of the company whose system is raising the error message, a unique indication of the application that is raising the error message, and a unique error code for the error message. The standardized error message may also include information (e.g., links to a knowledge base article) as to how the error may potentially be remediated. By using a standardized naming scheme and recommending remedial actions that are relevant to each respective raised system error, users may more quickly understand which errors to address first and what possible solutions may be employed in order to resolve those errors—while remaining confident that any encrypted information has remained uncompromised.

Turning now to FIG. 1, a schematic diagram of an embodiment of a computing system 100, such as a cloud computing system, where embodiments of the present disclosure may operate, is illustrated. Computing system 100 may include a client network 102, network 108 (e.g., the Internet), and a hosted platform 110 network, e.g., an enterprise platform service. In one embodiment, the client network 102 may be a local private network, such as local area network (LAN) that includes a variety of network devices that include, but are not limited to switches, servers, and routers. In another embodiment, the client network 102 represents an enterprise network that could include one or more LANs, virtual networks, data centers 112, and/or other remote networks. As shown in FIG. 1, the client network 102 is able to connect to one or more client devices 104A-C so that the client devices are able to communicate with each other and/or with the network hosting the platform service 110. The client devices 104A-C may be computing systems and/or other types of computing devices generally referred to as Internet of Things (IoT) devices that access cloud computing services, for example, via a web browser application or via an edge server device 116 that may act as a gateway between the client device and a remote device. According to some embodiments discussed herein, some (or all) of the content logged on edge server device 116 may be encrypted before it leaves the edge proxy and goes to the hosted instance, such that the hosted platform service 110 is unable to decrypt (and thus analyze or otherwise process) such encrypted content.

FIG. 1 also illustrates that the client network 102 includes a management, instrumentation, and discovery (MID) server 106 that facilitates communication of data between the network hosting the platform service 110, other external applications, data sources, and services, and the client network 102. Although not specifically illustrated in FIG. 1, the client network 102 may also include a connecting network device (e.g., a gateway or router) or a combination of devices that implement a customer firewall or intrusion protection system.

FIG. 1 illustrates that client network 102 is coupled to a network 108. The network 108 may include one or more computing networks available today, such as other LANs, wide area networks (WAN), the Internet, and/or other remote networks, in order to transfer data between the client devices 104A-C and the network hosting the platform service 110. Each of the computing networks within network 108 may contain wired and/or wireless programmable devices that operate in the electrical and/or optical domain. For example, network 108 may include wireless networks, such as cellular networks (e.g., Global System for Mobile Communications (GSM) based cellular network), WiFi® networks (WIFI is a registered trademark owned by Wi-Fi Alliance Corporation)), and/or other suitable radio-based network as would be appreciated by one of ordinary skill in the art upon viewing this disclosure. The network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks.

In FIG. 1, the network hosting the platform service 110 may be a remote network (e.g., a cloud network) that is able to communicate with the client devices 104A-C via the client network 102 and network 108. The network hosting the platform service 110 provides additional computing resources to the client devices 104A-C and/or client network 102. For example, by utilizing the network hosting the platform service 110, users of client devices 104A-C are able to build and execute applications, such automated processes for various enterprise, IT, and/or other organization-related functions, such as error handling. In one embodiment, the network hosting the platform service 110 includes one or more data centers 112, where each data center 112 could correspond to a different geographic location. Each of the data center 112 includes a plurality of server instances 114, where each server instance 114 can be implemented on a physical computing system, such as a single electronic computing device (e.g., a single physical hardware server) or could be in the form a multi-computing device (e.g., multiple physical hardware servers). Examples of server instances 114 include, but are not limited to a web server instance (e.g., a unitary Apache installation), an application server instance (e.g., unitary Java® Virtual Machine), and/or a database server instance, e.g., a unitary MySQL® catalog (MySQL® is a registered trademark owned by MySQL AB A COMPANY).

To utilize computing resources within the hosted platform network 110, network operators may choose to configure the data centers 112 using a variety of computing infrastructures. In one embodiment, one or more of the data centers 112 are configured using a multi-tenant cloud architecture, such that a single server instance 114, which can also be referred to as an application instance, handles requests and serves multiple customers. In other words, data centers with multi-tenant cloud architecture commingle and store data from multiple customers, where multiple customer instances are assigned to a single server instance 114. In a multi-tenant cloud architecture, the single server instance 114 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure to single server instance 114 causing outages for all customers allocated to the single server instance 114.

In another embodiment, one or more of the data centers 112 are configured using a multi-instance cloud architecture to provide every customer its own unique customer instance. For example, a multi-instance cloud architecture could provide each customer instance with its own dedicated application server and dedicated database server. In other examples, the multi-instance cloud architecture could deploy a single server instance 114 and/or other combinations of server instances 114, such as one or more dedicated web server instances, one or more dedicated application server instances, and one or more database server instances, for each customer instance. In a multi-instance cloud architecture, multiple customer instances could be installed on a single physical hardware server, where each customer instance is allocated certain portions of the physical server resources, such as computing memory, storage, and processing power. By doing so, each customer instance has its own unique software stack that provides the benefit of data isolation, relatively less downtime for customers to access the hosted platform network 110, and customer-driven upgrade schedules. An example of implementing a customer instance within a multi-instance cloud architecture will be discussed in more detail below with reference to FIG. 2.

Figure 2:
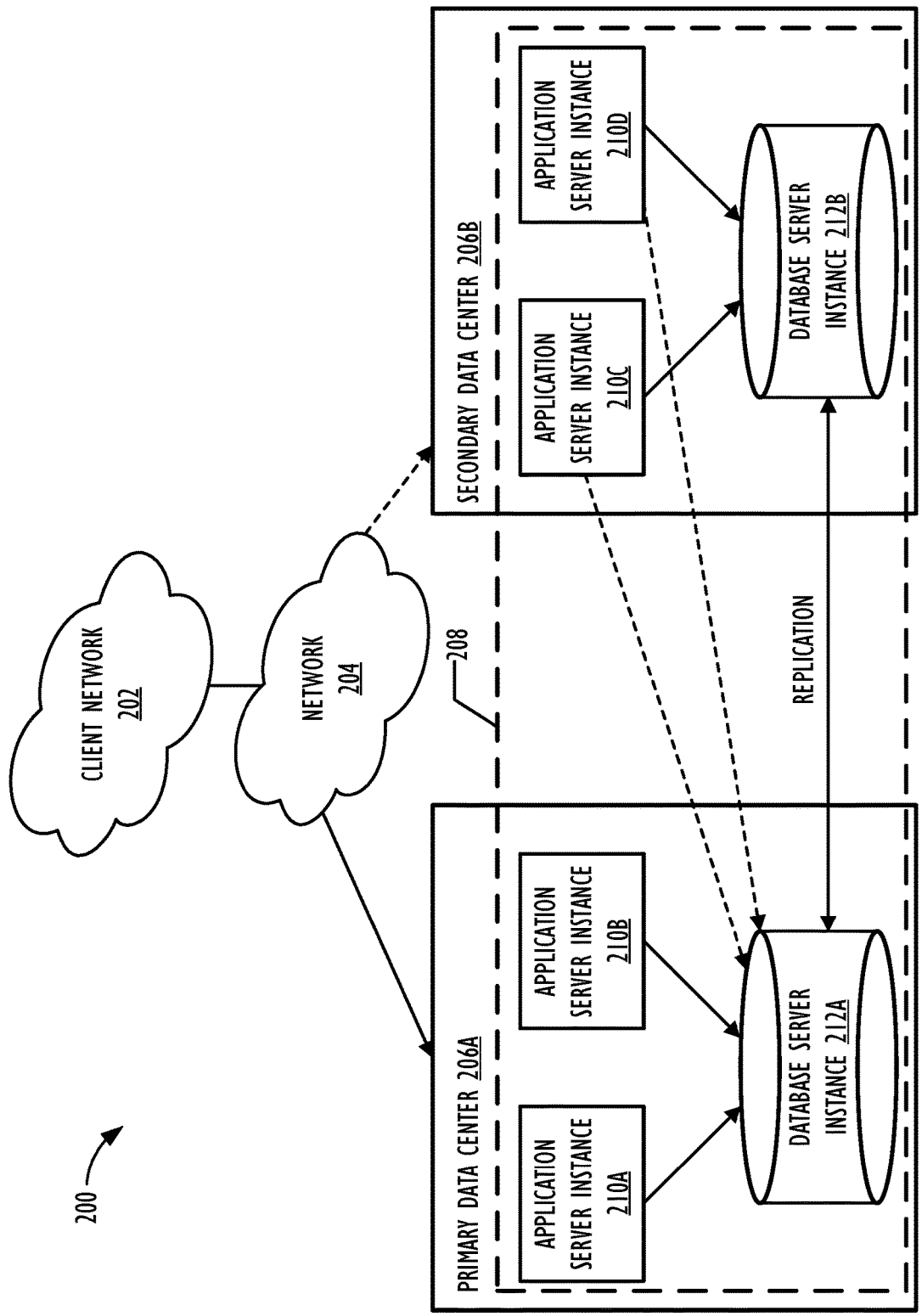
FIG. 2 is a block diagram of an embodiment of a multi-instance cloud architecture where embodiments of the present disclosure may operate.

FIG. 2 is a schematic diagram of an embodiment of a multi-instance cloud architecture 200 where embodiments of the present disclosure may operate. FIG. 2 illustrates that the multi-instance cloud architecture 200 includes a client network 202 that connects to two data centers 206a and 206b via network 204. Client network 202 and network 204 may be substantially similar to client network 102 and network 108 as described in FIG. 1, respectively. Data centers 206a and 206b can correspond to FIG. 1's data centers 112 located within hosted platform network 110. Using FIG. 2 as an example, a client instance 208 is composed of four dedicated application server instances 210a-210d and two dedicated database server instances 212a and 212b. Stated another way, the application server instances 210a-210d and database server instances 212a and 212b are not shared with other client instances 208. Other embodiments of the multi-instance cloud architecture 200 could include other types of dedicated server instances, such as a web server instance. For example, the client instance 208 could include the four dedicated application server instances 210a-210d, two dedicated database server instances 212a and 212b, and four dedicated web server instances (not shown in FIG. 2).

To facilitate higher availability of the client instance 208, the application server instances 210a-210d and database server instances 212a and 212b are allocated to two different data centers 206a and 206b, where one of the data centers 206 acts as a backup data center. In reference to FIG. 2, data center 206a acts as a primary data center 206a that includes a primary pair of application server instances 210a and 210b and the primary database server instance 212a for the client instance 208, and data center 206b acts as a secondary data center 206b to back up the primary data center 206a for a client instance 208. To back up the primary data center 206a for the client instance 208, the secondary data center 206 includes a secondary pair of application server instances 210c and 210d and a secondary database server instance 212b. The primary database server instance 212a is able to replicate data to the secondary database server instance 212b.

As shown in FIG. 2, the primary database server instance 212a may replicate data to the secondary database server instance 212b using, e.g., a Master-Master MySQL Binlog replication operation. The replication of data between data could be implemented by performing full backups weekly and daily incremental backups in both data centers 206a and 206b. Having both a primary data center 206a and secondary data center 206b allows data traffic that typically travels to the primary data center 206a for the client instance 208 to be diverted to the second data center 206b during a failure and/or maintenance scenario. Using FIG. 2 as an example, if the application server instances 210a and 210b and/or primary data server instance 212a fails and/or is under maintenance, data traffic for client instances 208 can be diverted to the secondary application server instances 210c and the secondary database server instance 212b for processing.

Although FIGS. 1 and 2 illustrate specific embodiments of a cloud computing system 100 and a multi-instance cloud architecture 200, respectively, the disclosure is not limited to the specific embodiments illustrated in FIGS. 1 and 2. For instance, although FIG. 1 illustrates that the hosted platform network 110 is implemented using data centers, other embodiments of the of the hosted platform network 110 are not limited to data centers and can utilize other types of remote network infrastructures. Moreover, other embodiments of the present disclosure may combine one or more different server instances into a single server instance. Using FIG. 2 as an example, the application server instances 210 and database server instances 212 may be combined into a single server instance. The use and discussion of FIGS. 1 and 2 are only examples to facilitate ease of description and explanation and are not intended to limit the disclosure to the specific examples illustrated therein.

Figure 3:
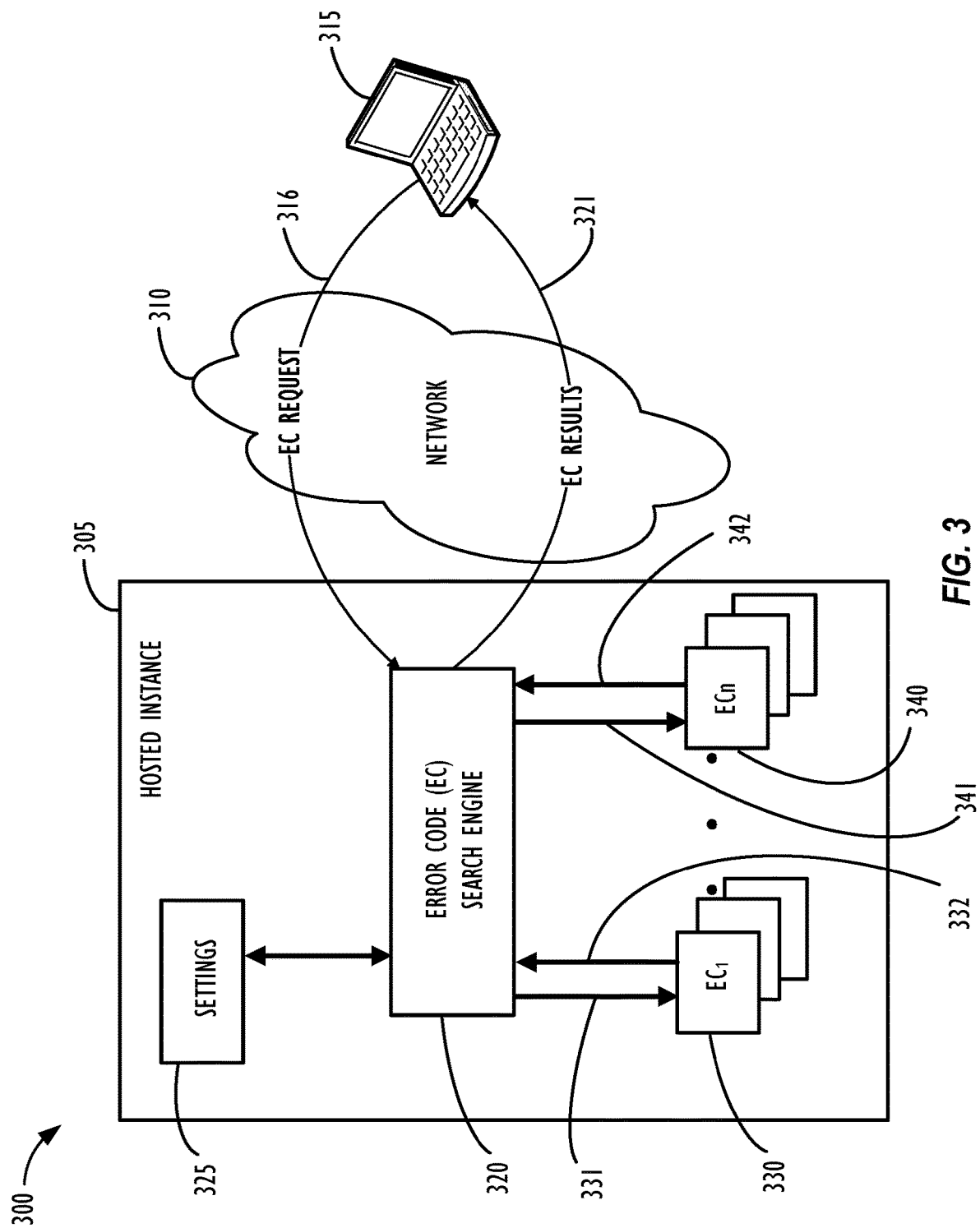
FIG. 3 is a block diagram of components and interactions of those components, according to one or more embodiments of the present disclosure.

FIG. 3 illustrates a block diagram 300 of an embodiment of a network environment and hosted instance 305 that may be used to support an improved standardized enterprise error code display and remediation system, according to one or more disclosed embodiments. As illustrated in FIG. 3, network 310 is a further example of a network such as the Internet or one or more corporate networks such as network 108 of FIG. 1 and network 204 of FIG. 2. In this example, network 310 may represent a single network or a combination of networks that may be configured to transmit an error code request 316 from a remote client device 315 to an error code search engine 320 and return error code search results 321 from search engine 320 to remote client device 315.

Client device 315 may be configured to communicate through network 310 with hosted instance 305 that may be hosted on a server instance in a cloud infrastructure, as described above. In this example, client device 315 may be configured to execute a web browser interface and receive a user indication of an error code request 316 to be transmitted to hosted instance 305 and search engine 320 for processing. For example, the error code request 316 may comprise the output of a log file, or other warning messages or exceptions logged by an application program, for which the client device is requesting a standard, system-wide error code. Error code request 316 may also comprise the name of the application raising the error and/or the name of the company hosting instance 305. In some embodiments, all or part of the information sent as a part of error code request 316 may be encrypted information that the hosted instance 305 is not able to decrypt, as will be explained in further detail below. Search engine 320 may receive error code request 316 and obtain informational settings 325 from within client hosted instance 305 pertaining to the processing of error code request 316. Alternatively, settings may be embedded within error code request 316 without the need to reference settings 325.

Once search engine 320 has obtained a sufficient amount of information pertaining to error code request 316, a search process of the system's standardized error codes may be initiated in order to identify the appropriate error code results (330, 340) based on the respective search queries, as shown by interface lines 331, 341. In some embodiments, an error code "key" may be used to help generate a link or URL that will direct a user to the relevant information regarding each of the returned error codes. As will be discussed in further detail with reference to FIG. 4, in some embodiments, part of the information sent in error code request 316 may be encrypted and other information may be unencrypted. Thus, the search engine 320 may need to employ various string-matching techniques on the unencrypted data and/or other artificial intelligence-based techniques to determine the appropriate system error code for the information being reported in error code request 316. If encrypted, the data may be decrypted on the way back through the proxy edge server, e.g., for display on the client's web browser.

Each error code search request 316 may return a group of one or more error codes matching the search criteria. In some cases, a search request may pertain to multiple distinct error conditions, whereas, in other cases, there may be multiple error codes that apply equally to a given situation. For example, a first search request may return a group of error codes, "Error Code Set 1" ($EC_1$) 330, as shown by interface line 332, which will contain all the relevant error codes and related remedial information necessary for the client device 315 to generate an informative user interface page (e.g., a dialog box or form) allowing the user to view the error messages and/or articles with potential solutions to such errors, as will be described in greater detail with reference to FIGS. 6-8. Likewise, additional search requests may be handled by search engine 320, returning different search results (e.g., partially overlapping search results with other search queries or search results that do not share overlapping results with other search queries), as represented in FIG. 3 by "Error Code Set n" ($EC_n$) 340, and as shown by interface line 342. Again, each returned EC group will contain all the relevant error code information and related remedial information necessary for the for the client device 315 to generate an informative user interface page allowing the user to view the error messages and/or articles with potential solutions to such errors. Of course, in some instances, only a single, unique system-wide error code will be returned in response to the first search request. As will be explained in further detail below, in some embodiments, client device 315 may have already determined the appropriate system-wide error code to use for a given error, and thus report the appropriate error code back directly to hosted instance 305, without the need for hosted instance 305 to attempt to search for and determine the appropriate error code as described above.

Block diagram 300 illustrates an example of a portion of a service provider cloud infrastructure (e.g., hosted platform network 110 of FIG. 1) connected via a network 310, such as the Internet, to a client device 315 to provide a user interface to network applications, executing within a client instance, via a web browser, as an example. Network 310 is a further example of a network such as network 108 of FIG. 1 and network 204 of FIG. 2. Details of these networks are discussed above with reference to each of FIGS. 1 and 2 and are not discussed further here. Service provider cloud infrastructure hosted instance 305 illustrates cloud resources and server instances similar to those explained with respect to FIG. 2, but is illustrated here to show support for an error code search capability within a single hosted instance 305. Of course, cloud provider infrastructure may be configured to support a plurality of end-user devices, such as end-user client device 315, concurrently, wherein each end-user device is in communication with the single hosted instance 305. Also, cloud provider infrastructures may be configured to support any number of client instances, such as a client instance accessed by end-user client device 315, concurrently, with each of the instances in communication with one or more end-user devices. As mentioned above, an end-user may also interface with hosted instance 305 using an application that is executed within a web browser.

Figure 4:
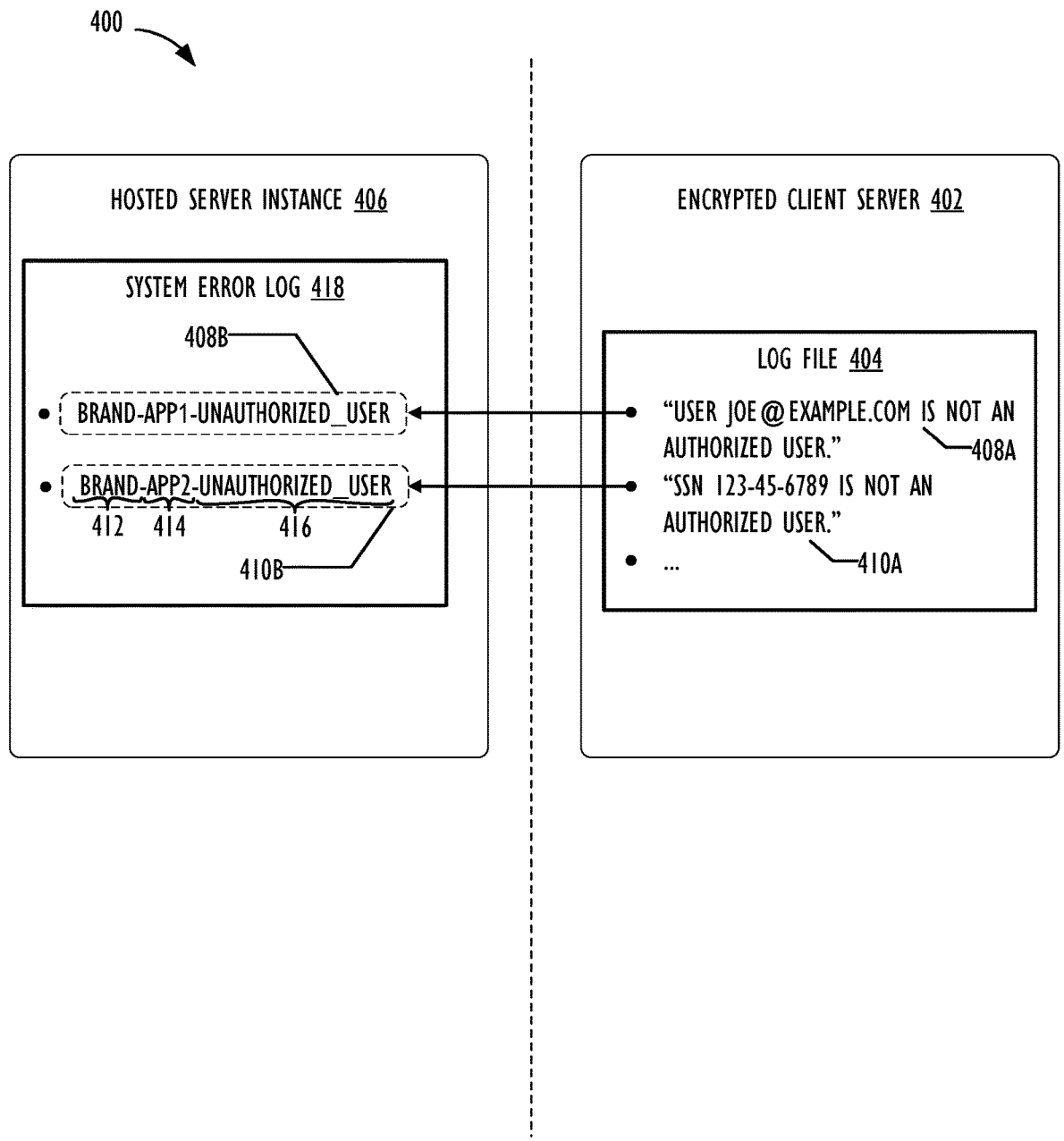
FIG. 4 is a simplified block diagram of a hosted server instance and an encrypted remote client server instance, for which system-level error codes may be generated, according to one or more embodiments of the present disclosure.

Referring now to FIG. 4, a simplified block diagram 400 of a hosted server instance 406 and an encrypted remote client server instance 402, for which system-level error codes may be generated, is illustrated, according to one or more embodiments of the present disclosure. As shown in FIG. 4, applications running on remote client server instance 402 may generate one or more log files 404. Log file 404 may comprise a record of error messages, warnings, or exceptions caught and reported by the various applications executing on remote client server instance 402. As may be understood, the error messages in log file 404 may comprise one or more pieces of sensitive information, such as a user's email address (as in error message 408a), social security number (as in error message 410a), or other personally-identifiable information. Other metadata associated with a given error message may include the date and time of the error message, and/or a URL or other link. In some instances, personally-identifiable information (or other parts of the log file 404) may be stored in an encrypted format on client server instance 402. In such cases, the hosted server instance 406 may not possess the keys necessary to decrypt any such encrypted information. While storing data in encrypted fashion allows customers to retain full control of the data encryption keys necessary to encrypt and decrypt their data (thus eliminating any concern of losing control of their most important information), it can make the process of determining a proper system-wide error code (or gathering statistics regarding system-wide errors) more difficult for the hosted service.

In some embodiments, by analyzing various other pieces of information associated with the error message, e.g., parts of the error message that are not encrypted, the application and/or routine that raised the error message, the historical error activity of a given node, etc., the hosted server instance 406 may determine the appropriate system-wide error code for each error. In other embodiments, the remote server (e.g., an edge proxy or MID server) may itself have access to the system-wide error code format and knowledge of how to construct the appropriate system-wide error codes, so that the hosted instance does not have to perform such processing.

As shown in FIG. 4, exemplary error message 408*a* may be converted to system-wide error code "BRAND-APP1-UNAUTHORIZED_USER" (408*b*), and error message 410*a* may be converted to system-wide error code "BRAND-APP2-UNAUTHORIZED_USER" (410*b*). In the example of FIG. 4, the first prefix of the error code comprises a branding component 412 (i.e., "BRAND"), e.g., relating to the brand of the enterprise system or application that is tracking the error messages; the second prefix of the error code comprises an application name component 414 (i.e., "APP1" or "APP2"); and the final component of the error code comprises a unique error description component 416 (i.e., "UNAUTHORIZED_USER). As may now be appreciated, although error message 408 and 410 both are being tracked by the same branded system (i.e., "BRAND") and both related to the same type of error (i.e., an "UNAUTHORIZED_USER" error), the unique system-wide error code strings for each error is actually different because the errors have been raised by different applications (i.e., "APP1" in the case of error message 408 and "APP2" in the case of error message 410). In the case of error messages that are common to many applications, this error code naming scheme may help both with the system's ability to track which applications are raising which error messages, as well as with the system's ability to provide customized support, on a per-application basis. For example, the knowledge article explaining how to correct an "unauthorized user" error for APP1 may contain different information or different steps than the knowledge article explaining how to correct an "unauthorized user" error for APP2. Using the aforementioned system-wide error code naming scheme, the system would know which knowledge article was the correct one to share with a given customer in a given situation, thus potentially reducing the amount of time needed by the customer to resolve the error.

According to some embodiments, a system-wide error message does not need to be determined for every log message that is logged on the remote client instance. For example, the error codes may be limited to errors that are known to drive incident creation at a higher rate, errors that have distinct troubleshooting options, and/or errors that, if not addressed, will impede the use of platform or an application on the platform.

Figure 5:
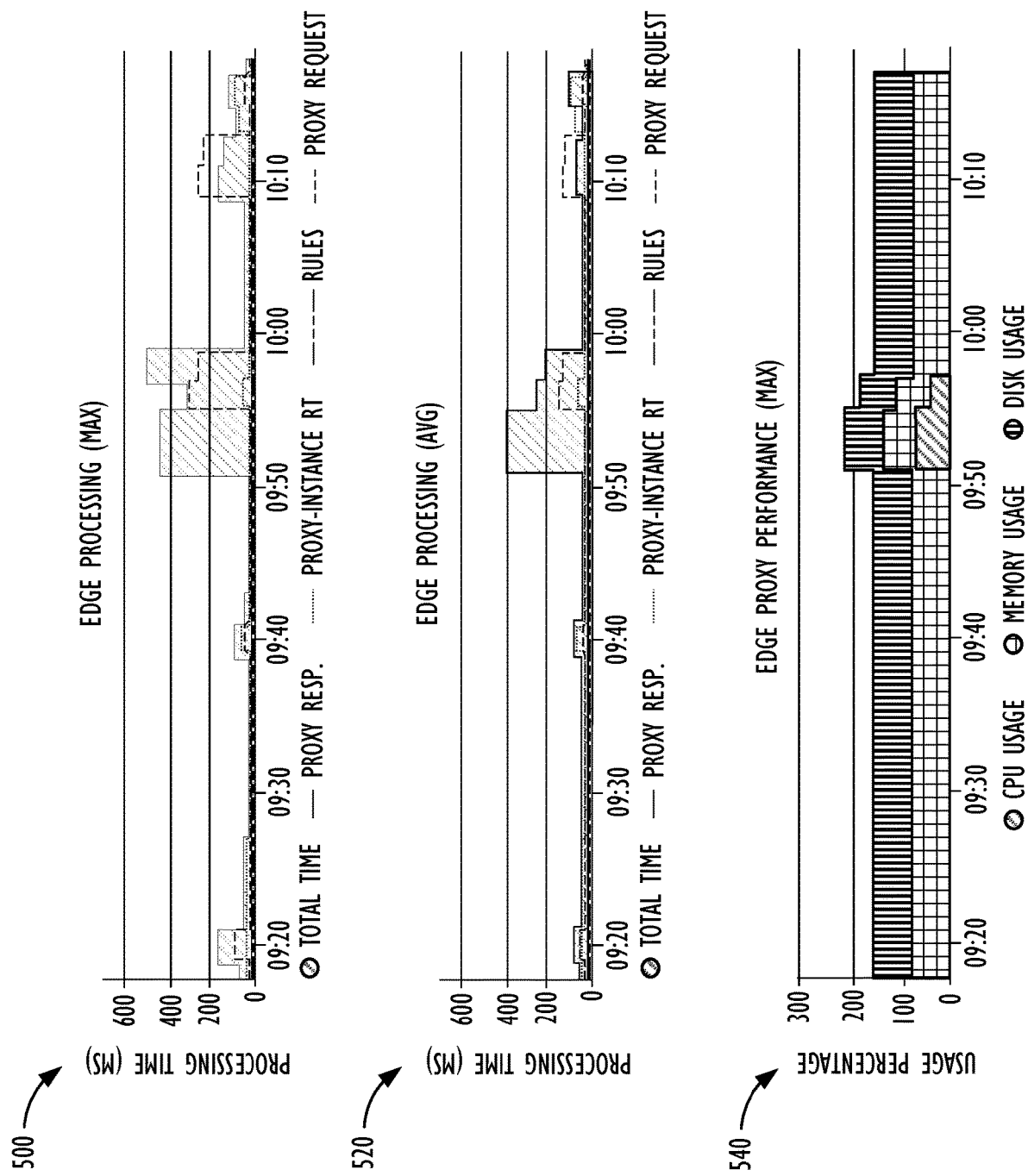
FIG. 5 illustrates various statistical metrics that may be tracked for an encrypted remote client server instance, according to one or more embodiments of the present disclosure.

Referring now to FIG. 5, various statistical metrics 500/520/540 that may be tracked for an encrypted remote client server instance are illustrated, according to one or more embodiments of the present disclosure. As mentioned above, anomalies in any of the captured statistical metrics' values may result in the creation of an appropriate system-wide error code to help in remediating the current error condition(s). Statistical metrics captured on the proxy server instance may include the following: CPU usage; latencies; memory usage; metrics regarding the overall health of the system (e.g., database status, current number of connections, current number of active threads, etc.); metrics regarding the health of the synchronization/integration process with the hosted server (e.g., authentication with server, the certificate used for the TLS connection, content checks upon the receipt of data from the server, etc.); and errors raised, including system-wide error codes (which may, e.g., be aggregated by type or application).

For example, graph 500 shows an exemplary tracking of maximum processing time (in milliseconds) for an edge server. The diagonal line shaded-in bars across the graph 500 represent the total maximum latency at a given moment in time, i.e., a summing of the maximum values of all the constituent tracked latency categories, e.g., "proxy response," "proxy-instance round trip (RT)," "rules," and "proxy request." As may be seen, in the particular example of graph 500, the "proxy request" component appears to be the dominant cause of latency over the time period shown in the graph.

As another example, graph 520 shows an exemplary tracking of average processing time (in milliseconds) for an edge server. Again, the diagonal line shaded-in bars across the graph 520 represent the total average latency at a given moment in time, i.e., a summing of the average values of all the constituent tracked latency categories, e.g., "proxy response," "proxy-instance round trip (RT)," "rules," and "proxy request." As may be seen, in the particular example of graph 520, the "proxy request" component again appears to be the dominant cause of latency over the time period shown in the graph. By tracking an average latency time (or mean, median, etc.), the system may be able to 'smooth out' any outlying maximum or minimum latency times on a given proxy and get a more accurate sense of the true causes of latency in the system over a given period of time.

Graph 540 shows another exemplary tracking view that may be provided in the system, i.e., a view of the maximum edge proxy server performance load over time (in terms of percentage of max usage). The vertically-striped bars across the graph 540 represent disk usage on the edge proxy server, the square-filled bars across the graph 540 represent memory usage on the edge proxy server, and the diagonally-striped bars across the graph 540 represent CPU usage on the edge proxy server. As may be seen, in the particular example of graph 540, there appears to have been a spike in CPU usage around 09:51, while disk usage and CPU usage remained fairly high but stable across the measured time period. This peak in CPU usage also appears to correspond with the peaks in latency times in graphs 500 and 520, indicating that one or more errors of some consequence occurred around 09:51, which errors may, e.g., need to be handled with greater urgency, due the system disruptions they appeared to be causing.

According to some embodiments, the various statistical metrics may be reported in near-real processing time, so that appropriate corrective action may be taken before a problem has persisted within an instance for too long of an amount of time. The various categories shown on the graphs, e.g., "proxy response," "proxy-instance round trip," "rules," and "proxy request" may each be individually toggled on or off via the user interface so that a user may easily tell at a glance if a particular part of the pipeline is a leading contributor to the system latency. The method of reporting latency and other system statistical metrics as illustrated in FIG. 5 also has the advantage that it does not violate the encryption in place at the remote proxy server, i.e., it does not report to the user any of the sensitive, encrypted information from the edge server that may be giving rise to the latency. It merely provides a proactive way for a user of the system to determine whether a particular part of the system is experiencing increased resources usage or latency, which may be indicative of (or result in the creation of) one or more errors at a remote proxy server. According to some embodiments, the various statistical metrics discussed above may be tracked on a per-proxy basis, so that individual problem areas may easily be located and monitored at a glance, e.g., via the use of a user interface "dashboard" or other graphical user interface on a display device.

Figure 6:
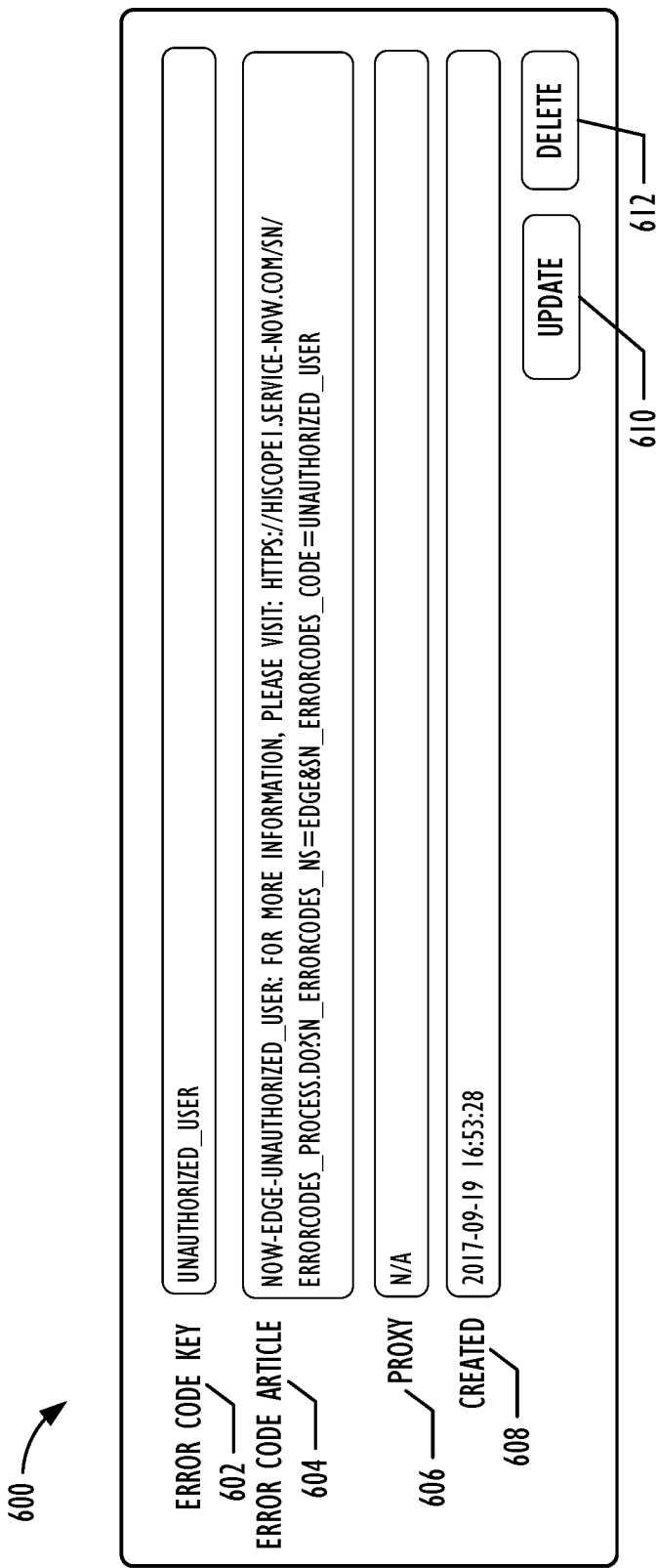
FIG. 6 illustrates an exemplary user interface page for viewing and/or updating information related to system-level error codes in an enterprise system, according to one or more embodiments of the present disclosure.

Referring now to FIG. 6, an exemplary user interface page 600 for viewing and/or updating information related to system-level error codes in an enterprise system is illustrated, according to one or more embodiments of the present disclosure. User interface page 600 may, e.g., comprise various components, such as: a field 602 for the error code key, i.e., a unique name (per application space) for a particular error, which error code may also be used to identify a knowledge article page (or anchor on such a page). In the event that a log file contains the appropriate system-wide error code for a given error, it may also provide a URL link (604) that may take a user directly to the knowledge article related to the error code. The user interface page 600 may also include other auxiliary fields, such as a proxy field (606) to indicate which proxy server a given error code was raised from, and a date/time created field (608), so that a user may see when a given system error code was created (or last updated). Finally, user interface page 600 may provide a user with the ability to update (608) or delete (610) the system error code entry, e.g., in the event that the URL link to a knowledge base article changes, necessitating an update, or in the event that a system-wide error code is no longer needed and may be deleted. User interfaces according to other embodiments may also comprise fields for a user to view or update the severity, root cause, effect, and/or potential corrective actions for the particular error.

Figure 7:
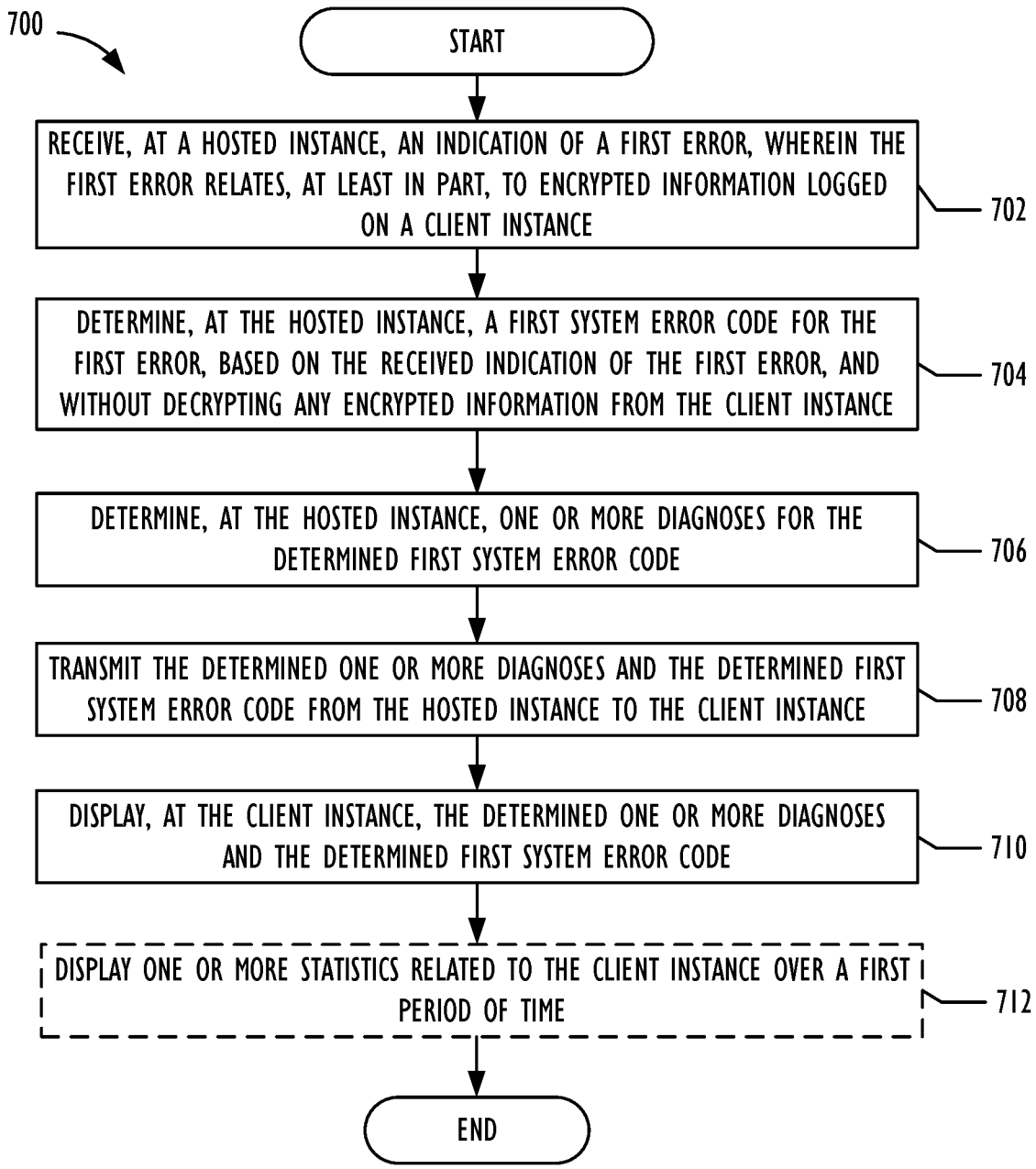
FIG. 7 is a flowchart of an embodiment of a method that provides system-level error codes to a remote client server having at least partially encrypted content.

Referring now to FIG. 7, a flowchart 700 of an embodiment of a method that provides system-level error codes to a remote client server having at least partially encrypted content is illustrated. First, at Step 702, the method may receive, e.g., at a hosted instance of a cloud platform providing enterprise management-related services, an indication of a first error, wherein the first error relates, at least in part to encrypted information logged on a remote client instance. In such a situation, the indication of the first error may comprise information from a log file or other exception information from a program or application running on the client instance. In some implementations, such information may include one or more pieces of encrypted content that the hosted instance will not have the ability to decrypt. Next, at Step 704, the hosted instance may determine a first system-wide standard error code for the first error, wherein the determination may be made without decrypting any of the encrypted information sent from the client instance.

At Step 706, the method may determine, at the hosted instance, one or more diagnoses for the determined system error code. The diagnosis may be contained, e.g., in a knowledge base article that had been previously written for the particular system error code matching the indicated first error condition. Next, at Step 708, the determined first error code and one or more diagnoses may be transmitted to the client instance. Upon receipt, the client instance may display the error code and one or more diagnoses, e.g., via a user interface (Step 710). The user interface may also provide convenient links to information on likely means of solving the problem causing the present error condition.

In order to provide better insight into what is happening on the client instance, according to some embodiments, the hosted instance may also optionally provide the ability to display one or more statistical values (e.g., latency values or CPU/memory usage values) related to the client instance over a first period of time (Step 712), e.g., in the form of a graph or other chart. Latency values may, e.g., comprise the amounts of time spent in the various parts of the processing pipeline, as explained above with reference to the exemplary visualizations of FIG. 5. These visualizations may provide a better understanding for when (and why) certain proxies may be experiencing greater than normal latency issues. Further, anomalies in in any of the monitored statistical values may result in the creation of an appropriate system-wide error code to help in remediating the current error condition(s). At this point, one iteration of the method 700 may be considered completed, with the understanding that it may be executed many times consecutively (or simultaneously), i.e., whenever a new error indication is sent to the hosted instance for processing.

Figure 8:
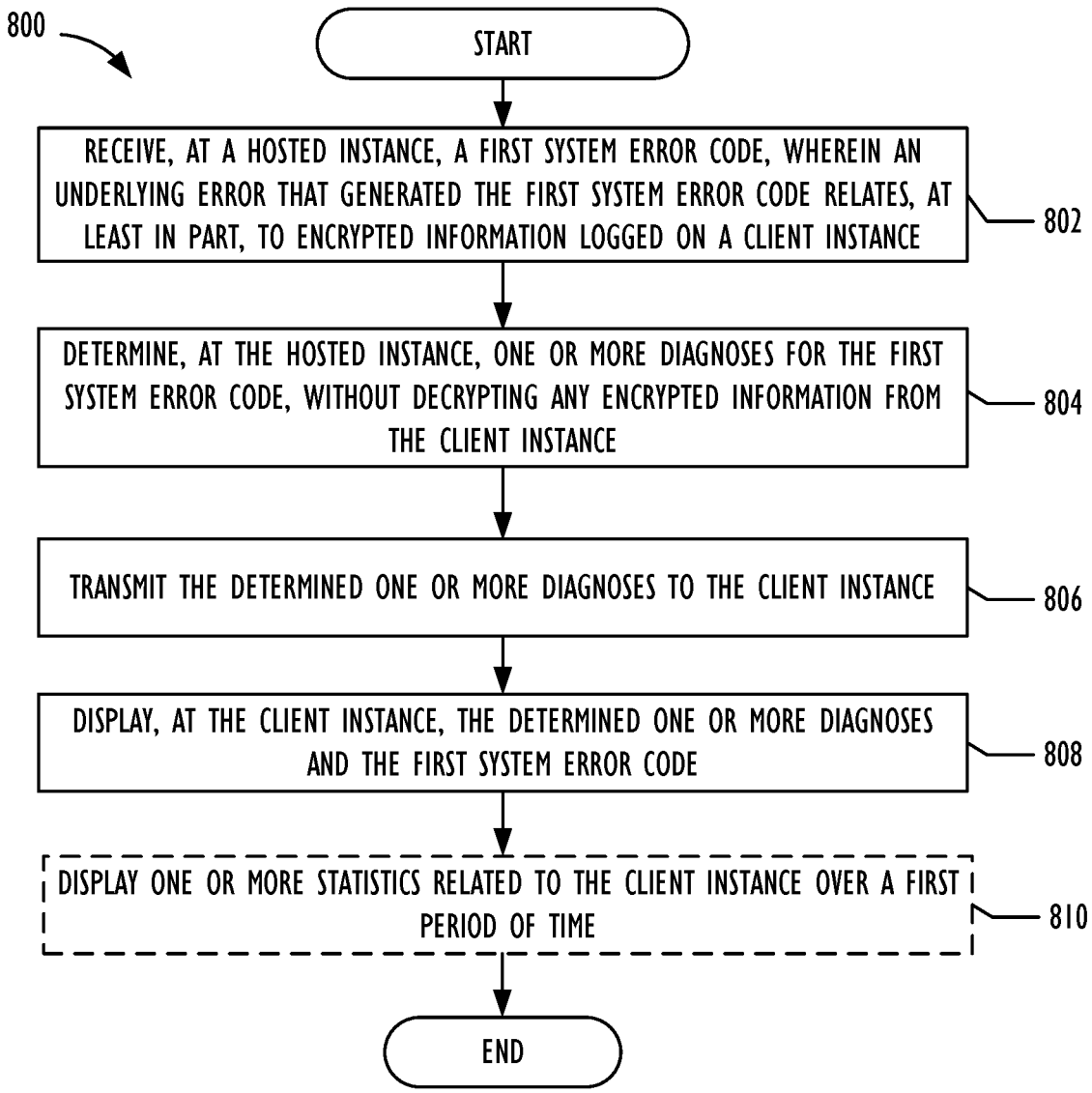
FIG. 8 is a flowchart of another embodiment of a method that provides system-level error codes to a remote client server having at least partially encrypted content.

Referring now to FIG. 8, a flowchart 800 of another embodiment of a method that provides system-level error codes to a remote client server having at least partially encrypted content is illustrated. Unlike the method 700 described above with reference to FIG. 7, in method 800 of FIG. 8, the remote instance has already identified the appropriate system-wide error code to use for a given error and is able to report it back to the hosted instance directly. First, at Step 802, the method may receive, at the hosted instance, a first system error code directly from the client instance. Again, the error may relate to encrypted information at the client instance that the hosted instance does not have the ability to decrypt. Next, at Step 804, the method may determine, at the hosted instance, one or more diagnoses for the system error code. At Step 806, the determined one or more diagnoses may be transmitted to the client instance. Upon receipt, the client instance may display the error code and one or more diagnoses, e.g., via a user interface (Step 808). The user interface may also provide convenient links to information on likely means of solving the problem causing the present error condition. Finally, as with FIG. 7, in order to provide better insight into what is happening on the client instance, according to some embodiments, the hosted instance may also optionally display one or more statistical values related to the latency, usage, health, etc., of the client instance over a first period of time (Step 810). When there are no more error codes to process, the method 800 may end.

Figure 9:
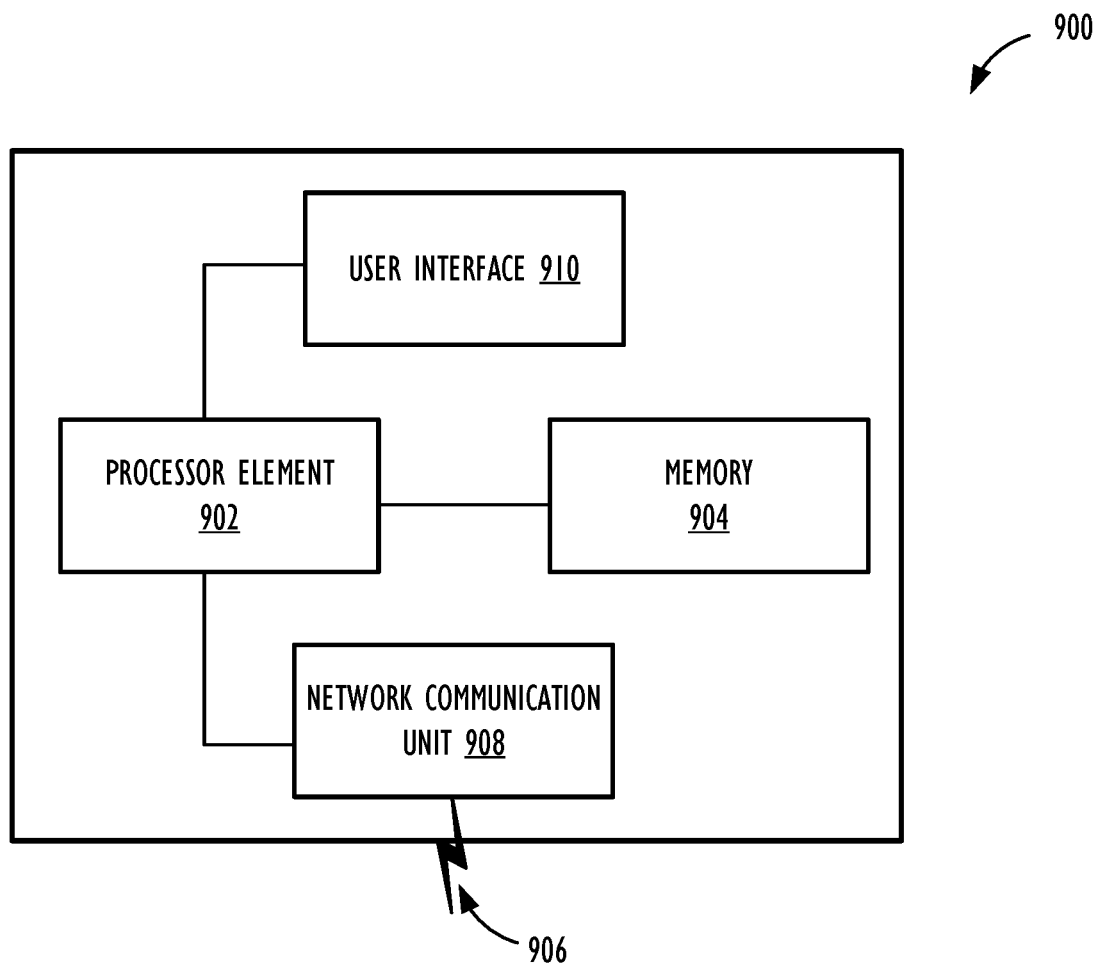
FIG. 9 is a block diagram illustrating an embodiment of a computing system for use with techniques described herein.

Referring now to FIG. 9, a block diagram illustrates a computing device 900 that may be used for implementing one or more of the techniques described herein. For example, the computing device 900 illustrated in FIG. 9 could represent a client device or a physical server device. As shown in FIG. 9, the computing device 900 can include can also include one or more input/output devices, such as a network communication unit 908 that could include a wired communication component and/or a wireless communications component 906, which can be coupled to processor element 902. The network communication unit 908 can utilize any of a variety of standardized network protocols, such as Ethernet, TCP/IP, to name a few of many protocols, to effect communications between devices and comprise one or more transceiver(s) that utilize the Ethernet, power line communication (PLC), WiFi®, and/or other communication methods.

The computing system 900 includes a processing element 902 that contains one or more hardware processors, where each hardware processor may have a single or multiple processor cores. In one embodiment, the processing element 902 may include at least one shared cache that stores data (e.g., computing instructions) that are utilized by one or more other components of processing element 902. For example, the shared cache may be locally cached data stored in a memory for faster access by components of the processing elements 902. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) such as a microprocessor. Although not illustrated in FIG. 9, the processing element 902 may also include one or more other types of hardware processing components, such as graphics processing units (GPU), application specific integrated circuits (ASICs), field-programmable gate arrays (FPGAs), and/or digital signal processors (DSPs).

FIG. 9 illustrates that memory 904 may be operatively coupled to processing element 902. Memory 904 may be a non-transitory medium configured to store various types of data. For example, memory 904 may include one or more memory devices that comprise a non-volatile storage device and/or volatile memory. Volatile memory, such as random access memory (RAM), can be any suitable non-permanent storage device. The non-volatile storage devices can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage device may be used to store overflow data if allocated RAM is not large enough to hold all working data. The non-volatile storage device may also be used to store programs that are loaded into the RAM when such programs are selected for execution.

Persons of ordinary skill in the art are aware that software programs may be developed, encoded, and compiled in a variety computing languages for a variety software platforms and/or operating systems and subsequently loaded and executed by processing element 902. In one embodiment, the compiling process of the software program may transform program code written in a programming language to another computer language such that the processing element 902 is able to execute the programming code. For example, the compiling process of the software program may generate an executable program that provides encoded instructions (e.g., machine code instructions) for processor 902 to accomplish specific, non-generic, particular computing functions.

After the compiling process, the encoded instructions may then be loaded as computer executable instructions or process steps to processing element 902 from storage (e.g., memory 904) and/or embedded within the processing element 902 (e.g., cache). Processing element 902 can execute the stored instructions or process steps in order to perform instructions or process steps to transform the computing device into a non-generic, particular, specially programmed machine or apparatus. Stored data, e.g., data stored by a storage device, can be accessed by processing element 902 during the execution of computer executable instructions or process steps to instruct one or more components within the computing device 900.

A user interface 910 can include a display, positional input device (such as a mouse, touchpad, touchscreen, or the like), keyboard, or other forms of user input and output devices. The user interface 910 can be coupled to processor element 902. Other output devices that permit a user to program or otherwise use the computing device can be provided in addition to, or as an alternative to, network communication unit 908. When the output device is (or includes) a display, the display can be implemented in various ways, including by a liquid crystal display (LCD), a cathode-ray tube (CRT), or a light emitting diode (LED) display, such as an organic LED (OLED) display. Persons of ordinary skill in the art are aware that the computing device 900 may comprise other components well known in the art, such as sensors, powers sources, and/or analog-to-digital converters, not explicitly shown in FIG. 9. For ease of discussion, FIG. 9 does not include further explanation of these other components well known in the art.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

What is claimed is:

1. A tangible, non-transitory, and computer-readable medium having instructions stored thereon that, when executed, cause one or more programmable control devices to:

receive, at a hosted instance, an error message, wherein the error message comprises non-encrypted information and encrypted information logged at a client instance that is remote to the hosted instance, and wherein the hosted instance cannot decrypt the encrypted information;

determine, at the hosted instance, a system error code for the error message based, at least in part on the non-encrypted information of the error message received, wherein the system error code does not rely on decrypting values of any of the encrypted information, and wherein the system error code conforms to a specified system error code format extendible by a user;

determine, at the hosted instance, one or more diagnoses for the system error code; and transmit the system error code and the one or more diagnoses from the hosted instance to the client instance.

2. The tangible, non-transitory, and computer-readable medium of claim 1, wherein the hosted instance does not possess keys used to decrypt the encrypted information.

3. The tangible, non-transitory, and computer-readable medium of claim 1, wherein the specified system error code format comprises at least one of the following components: a branding component; an application name component; and a unique error description component.

4. The tangible, non-transitory, and computer-readable medium of claim 1, wherein the error message comprises an entry in a log file on the client instance.

5. The tangible, non-transitory, and computer-readable medium of claim 1, wherein the one or more determined diagnoses comprise at least one of the following: a message with remediation guidance related to an error corresponding to the error message; a root cause of an error corresponding to the error message; a knowledge article related to an error corresponding to the error message; a link to a knowledge article related to an error corresponding to the error message; one or more symptoms of an error corresponding to the error message; one or more effects of an error corresponding to the error message; and one or more corrective actions related to an error corresponding to the error message.

6. The tangible, non-transitory, and computer-readable medium of claim 1, wherein the instructions further cause the one or more programmable control devices to:
display, on a display device, one or more statistical values related to the client instance over a period of time.

7. The tangible, non-transitory, and computer-readable medium of claim 6, wherein neither the one or more determined diagnoses nor the displayed one or more statistical values expose decrypted values of any of the encrypted information logged at the client instance.

8. A tangible, non-transitory, and computer-readable medium comprising instructions stored thereon to cause one or more programmable control devices to:
receive, at a hosted instance, a system error code, wherein the system error code is generated based at least in part on an error message comprising encrypted information and unencrypted information logged at a client instance that is remote to the hosted instance;
determine, at the hosted instance, one or more diagnoses for the system error code, wherein the determination is made without decrypting any of the encrypted information logged at the client instance, and wherein the hosted instance cannot decrypt the encrypted information;
transmit the one or more diagnoses from the hosted instance to the client instance; and
display, on a display device, one or more statistical values related to the client instance over a period of time, wherein neither the one or more diagnoses nor the one or more statistical values expose decrypted values of any of the encrypted information logged at the client instance.

9. The tangible, non-transitory, and computer-readable medium of claim 8, wherein the hosted instance does not possess keys necessary to decrypt the encrypted information.

10. The tangible, non-transitory, and computer-readable medium of claim 8, wherein the system error code conforms to a specified system error code format.

11. The tangible, non-transitory, and computer-readable medium of claim 10, wherein the specified system error code format comprises at least one of the following components: a branding component; an application name component; and a unique error description component.

12. The tangible, non-transitory, and computer-readable medium of claim 10, wherein the specified system error code format is extendible by a user.

13. The tangible, non-transitory, and computer-readable medium of claim 8, wherein the one or more determined diagnoses comprise at least one of the following: a message with remediation guidance related to an error corresponding to the error message; a root cause of an error corresponding to the error message; a knowledge article related to an error corresponding to the error message; a link to a knowledge article related to an error corresponding to the error message; one or more symptoms of an error corresponding to the error message; one or more effects of an error corresponding to the error message; and one or more corrective actions related to an error corresponding to the error message.

14. A system, comprising:
a display device;
a non-transitory memory; and
one or more hardware processors configured to read instructions from the non-transitory memory to cause the one or more hardware processors to:
receive an indication of an error, wherein the error relates, at least in part, to encrypted information logged at a client instance that is remote to the system, and wherein the one or more hardware processors cannot decrypt the encrypted information;
determine a system error code for the error based, at least in part on the received indication of the error, wherein the system error code does not rely on decrypting values of any of the related encrypted information;
determine one or more diagnoses for the system error code;
transmit the system error code and the one or more diagnoses to the client instance; and
cause a display of, on a display device, one or more statistical values related to the client instance over a period of time, wherein neither the one or more diagnoses nor the one or more statistical values expose decrypted values of any of the encrypted information logged at the client instance.

15. The system of claim 14, wherein the system error code conforms to a specified system error code format.

16. The system of claim 15, wherein the specified system error code format comprises at least one of the following components: a branding component; an application name component; and a unique error description component.

17. The system of claim 14, wherein the one or more determined diagnoses comprise at least one of the following: a message with remediation guidance related to the error; a root cause of the error; a knowledge article related to the error; a link to the knowledge article related to the error; one or more symptoms of the error; one or more effects of the error; and one or more corrective actions related to the error.

* * * * *